United States Patent
Bowers et al.

(10) Patent No.: US 6,654,646 B2
(45) Date of Patent: *Nov. 25, 2003

(54) ENHANCED MEMORY ADDRESSING CONTROL

(75) Inventors: Thomas Earl Bowers, Warrenville, IL (US); Robert Joseph Gamoke, Batavia, IL (US); Glen D. Rocque, Aurora, IL (US); Paul Ronald Wiley, Naperville, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 413 days.

This patent is subject to a terminal disclaimer.

(21) Appl. No.: 09/735,967

(22) Filed: Dec. 13, 2000

(65) Prior Publication Data

US 2002/0072810 A1 Jun. 13, 2002

(51) Int. Cl.$^7$ .............................................. G05B 19/18
(52) U.S. Cl. .................. 700/5; 700/1; 700/2; 700/3; 700/4; 711/100; 711/101; 711/214; 711/200; 711/220; 712/14; 712/25; 712/27; 712/200; 712/204
(58) Field of Search ................ 700/1, 2, 3, 4, 700/5; 711/100–101, 200, 214, 220; 712/1, 10, 14, 25, 27, 200–203, 204

(56) References Cited

U.S. PATENT DOCUMENTS

| | | | | |
|---|---|---|---|---|
| 3,786,436 A | * | 1/1974 | Zelinski et al. | 711/213 |
| 4,458,325 A | * | 7/1984 | Nakata et al. | 708/206 |
| 4,893,279 A | * | 1/1990 | Rahman et al. | 365/230.03 |
| 5,033,048 A | * | 7/1991 | Pierce et al. | 714/719 |
| 5,361,338 A | * | 11/1994 | Kobayashi et al. | 712/226 |
| 5,410,658 A | * | 4/1995 | Sawase et al. | 712/246 |
| 5,583,806 A | * | 12/1996 | Widigen et al. | 708/708 |
| 5,612,911 A | * | 3/1997 | Timko | 708/670 |
| 5,935,238 A | * | 8/1999 | Talcott et al. | 712/206 |

* cited by examiner

Primary Examiner—Ramesh Patel

(57) ABSTRACT

A processing or control system having arrangements for separately and simultaneously generating instruction addresses and data addresses having two bus systems for accessing instruction and data storage, and having a single address range for both instructions and data. The boundary between the instruction range and the data range can be varied and placed under the control of the processor according to the needs of the particular application being processed. Some or all of the blocks of storage can access either the instruction bus or the data bus system, and the selection is made under the control of a control register within the processor. Advantageously, applications which require a larger amount of instruction storage, this can be provided; for applications which require a larger amount of data storage, that can be provided also; both are limited only by the total amount of storage available.

8 Claims, 3 Drawing Sheets

ENHANCED MEMORY ADDRESSING CONTROL

This application is related to application Ser. No. 09/735,966, filed on Dec. 13, 2003.

TECHNICAL FIELD

This invention relates to arrangements for controlling the range of addresses of memory available to a processor.

Problem:

One of the basic limitations of a processor system is the range of memory which can be attached to the central processing unit of the processor. In many modern processors, memory is basically dedicated to the instructions for controlling the processor (program), and the data on which the processor operates. In many such processors, efficiency is increased by having separate communities of program stores and data stores accessed by separate buses. In such cases, the program stores and the data stores have non-overlapping ranges of addresses of their memories. For certain operations, it is desirable to treat the contents of some of the program memory as data, and/or to treat the contents of some of the data memory as instructions. For example, if there is a failure in the program store community, the analysis of the failure is best carried out under the control of instructions supplied by the data store community. In the case of a failure of the data store community, it is desirable that the program store community store data concerning the maintenance status of the data store community. Therefore, in order to enhance the reliability of the system, it is best to have a single range of storage addresses which covers all of the addresses of both the program store community and the data store community. This is, in fact, what is done, for example, in the electronic switching systems, such as the 4 ESS™Switch, manufactured by Lucent Technologies Inc.

A problem arises because the range of addresses for instructions and for data may not be adequate for particular applications.

Solution:

The above problem is solved and an advance is made over the teachings of the prior art in accordance with Applicants' invention, wherein the boundary between instructions and data can be controlled by internal registers of a processor, and can, therefore, be moved; thus, providing more data or more instruction storage as needed for particular applications. In accordance with Applicants' preferred embodiment, a limited high-speed storage system providing, for example, 1 mega-word of storage can be configured to provide, for example, 25%, 50%, or 75% instruction storage, with the rest being data storage. In this preferred embodiment, additional lower speed storage is provided to meet the demands of the many applications that need much more than 1 mega-word of storage. Advantageously, using this arrangement, applications which require heavy use of more instruction storage can be handled efficiently, as can applications which require heavy use of a larger amount of data storage, by dynamically reconfiguring the memory allocation for each application.

In accordance with this preferred embodiment, this arrangement is combined with another arrangement, wherein a processor has at least two modes of operation; one mode being the mode for using restricted address capabilities of the present processor, a second mode for using a much greater range of addresses, but restricted to the use of separate program and data addresses for respective separate program and data store communities. Applicants believe that the bulk of the software which requires the use of data from a program store community, and/or instructions from a data store community, are in the carry-over software necessary for maintaining the processor system, and that software and data for controlling the operation of additional services, and storing the data for these additional services, can be restricted to separate program and data store communities in which no instructions are stored in the data stores and no data is stored in the program stores. Advantageously, the availability of the two modes of operation, allows the carry-over software to be retained and executed in the first mode, and allows software for controlling a much larger address range of program and data stores to be executed in the second mode.

In accordance with one preferred embodiment of Applicants' invention, a first mode exists wherein all memory addressing is over the initial address range. This mode is particularly useful for executing carry-over software. When in this mode, an address in the instruction range generated by a instruction address generator, will cause an instruction to be fetched from the instruction range. If the address generated by the instruction address generator is in the data range, then that instruction is fetched from the data portion of the base memory range. In accordance with this preferred embodiment, there are separate buses associated with the instruction range and the data range. Therefore, if an instruction is fetched from an address in the data range, this instruction must be fetched using the data access bus.

Similarly, if a word of data is to be accessed from the data range, this word would be accessed using the data access bus. If data is to be accessed in the instruction range, then that data is accessed using the instruction access bus.

In accordance with the second mode of accessing memory, which constitutes Applicants' invention, if a second mode control is set, then when an instruction is fetched, but the unextended portion of the address is in the base data range, then that instruction is fetched using an extended address whose extension is specified by an instruction segment selector.

Similarly, in the alternate mode of memory accessing, if a data access is specified, the unextended portion of whose address is in the base instruction range, then the data is accessed from the address specified, but extended with the contents of a data segment selector.

However, in the second mode, if an instruction carries an address that is in the instruction range, then that instruction is fetched from the instruction range of the base memory; similarly, in the second mode, if a data access is executed whose address is in the data range of the base memory, then that data is accessed from the data portion of the base memory. This allows for easy access to the base range of memory.

Advantageously, using this type of arrangement, the range of memory that can be accessed by a processor is limited not by the addressing range of the central processing unit, but by the size of the address bus used for accessing memory. In Applicants' particular embodiment, the base range is 8 mega words of memory, but the address buses together allow up to 1,024 mega words of memory to be addressed.

BRIEF DESCRIPTION OF THE DRAWING(S)

DETAILED DESCRIPTION

Figure 1:
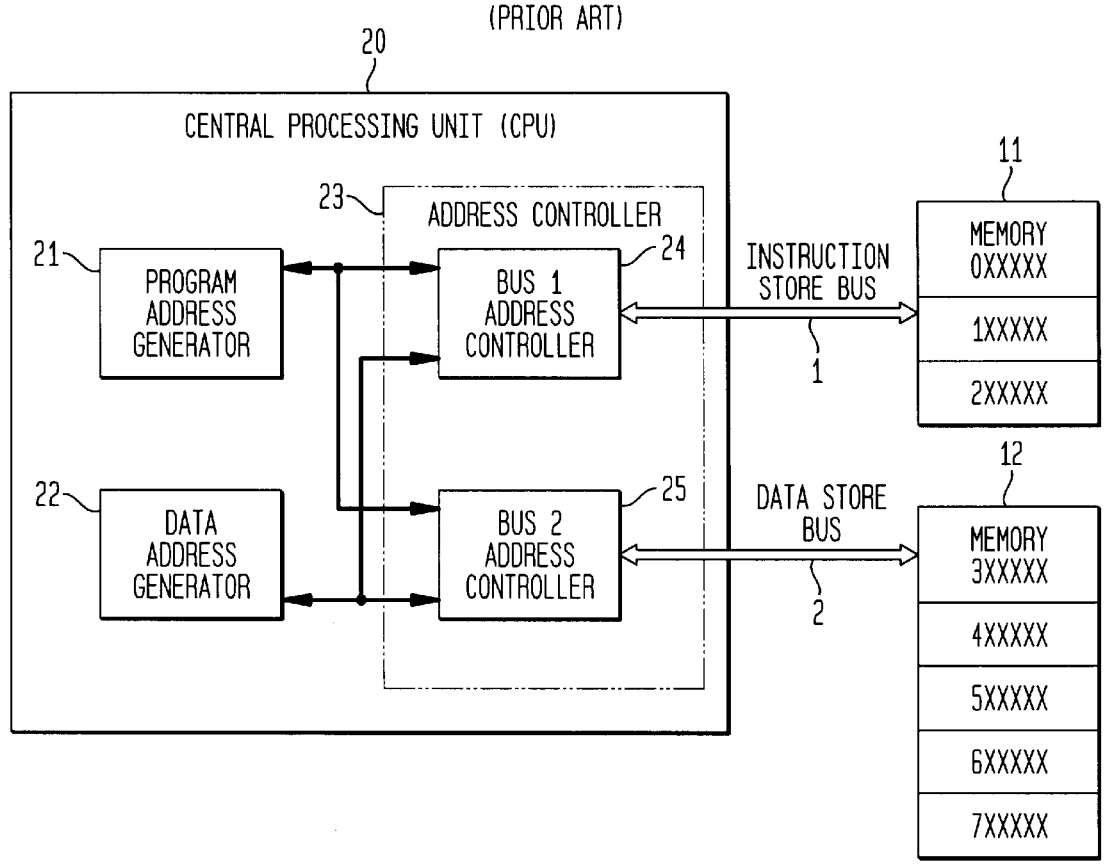
FIG. 1 is an exemplary embodiment of the prior art, showing total memory limited to 8 mega words.

FIG. 1 is a block diagram illustrating an example of the operation of the prior art. A central processing unit (20) drives two buses, bus (1) and bus (2). Attached to bus (1) is memory block (11), containing memory for address ranges 0xxxxx, 1xxxxx, and 2xxxxx, a total range of 3 megawords. ("X" represents any hexadecimal digit, so that a range, for example, of 000000 to 0FFFFF represents one megaword; each hexadecimal digit represents 4 binary digits). A central processing unit contains a program address generator (21) and a data address generator (22). The outputs of both of these address generators go a CPU address generator (23), which has a bus (1) address controller (24) and bus (2) address controller (25). The outputs of both the program address generator (21) and data address generator (22) are sent to both bus address controllers (24) and (25) in order to handle the case in which, for example, an instruction (whose address is generated by the program address generator (21)), is found in memory block (12) accessed via bus (2), or in case data (whose address is generated by data address generator 22), is found in memory block (11) accessed by bus (1). These bus address controllers each contain a hard wired decoder, which will identify whether an address is associated with bus (1) or bus (2). Also required in address controller (23), but not shown, are means of recognizing that both of the program address generator (21) and data address controller (22) have requested information accessed by the same bus, so that the memory block connected to that bus can be accessed sequentially.

In this exemplary embodiment, which is similar to the addressing arrangement of the 1-B processor for the 4 ESS™Switch, manufactured by Lucent Technologies Inc., memory block (11) is limited in range from address 000000 to address 2FFFFF, and memory block (12) is limited to addresses from memory address 300000 to memory address 7FFFFF. (The 4 ESS Switch actually uses addresses in the range of 3F8 00000 to 3 FFFF.FFF, and 1 megaword, blocks of instruction and data stores are interleaved. The address ranges used in this Detailed Description are used instead of the 4 ESS addresses to simplify the description).

Figure 2:
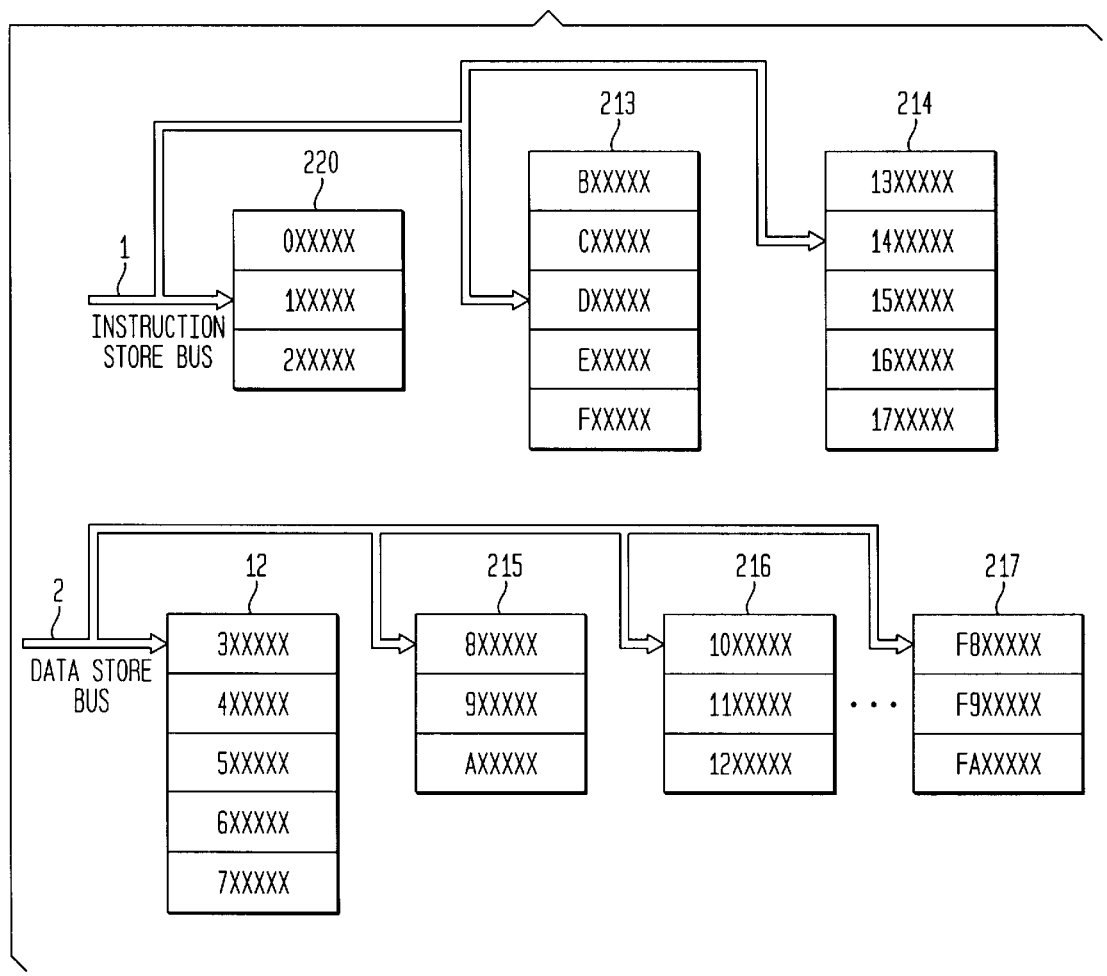
FIG. 2 is a block diagram illustrating the operation of Applicants' inventive second mode, in which separate program and data store communities each contain a much higher range of addresses.

FIG. 2 represents the operation of the system described in FIG. 1, when that system is placed in Applicants' new second mode of operation. In this second mode of operation, the links between the bus address controller (25) and the data memory block (12) are extended to access blocks 215, 216, . . . , 217, and the links between bus address controller (24) and program memory block (11) are extended to access blocks 213 aand 214. Thus, one address controller (24) takes the output of program address generator (21), and, if the decoding of the last range of the address, (i.e., that portion between 000000 and 7FFFFF), indicates an instruction address, (i.e., an address between 000000 and 2FFFFF), simply fetches an instruction from Block 11; if that decoding indicates a data address, the contents of the instruction segment selector 307 (FIG. 3) are prefixed to the base range address, and one of the memory blocks (213), or (214) is accessed. (In Applicants' preferred embodiment, only 10 mega words of instructions, and 48 mega words of data are added). Similarly, if the output of data address generator (22) indicates a base address in the instruction range, the data store bus address will be prefixed by the contents of the data segment selector (305) and data will be read from one of the memory blocks (215), (216), . . . , (217).

Note that in the second mode of Applicants' invention, all data accesses are from storage blocks accessed by bus (2), (the data bus), and all instruction accesses are from storage blocks accessed by bus (1), (the instruction bus).

Figure 3:
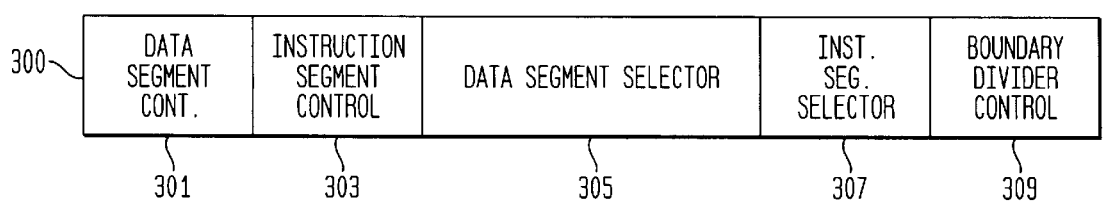
FIG. 3 is a diagram showing the contents of the alternate mode control register.

FIG. 3 illustrates the content of alternate mode control register (300). This register contains two control segments; the first, data segment control (301), indicating whether data segmentation is currently activated, and the second, instruction segment control (303), indicates whether instruction segmentation is currently activated. Note that the two are separately controllable so that it is possible to restrict data to the base range, (in which case, data may be read from the base instruction range). Similarly, if the instruction segment control is off, then no instructions are fetched from the extended segments, but instructions may be fetched from the base data range. Data segment selector (305) is the prefix to addresses generated within the processor and sent over bus (2) to access the proper data segment store, i.e., one of stores (215), (216), . . . , (217). Similarly, instruction segment selector (307) is used as a prefix on instruction bus (1), and is used to select one of the blocks (213), (214). The contents of the segment control register (300) can be changed in a single cycle under the control of one instruction.

Figure 4:
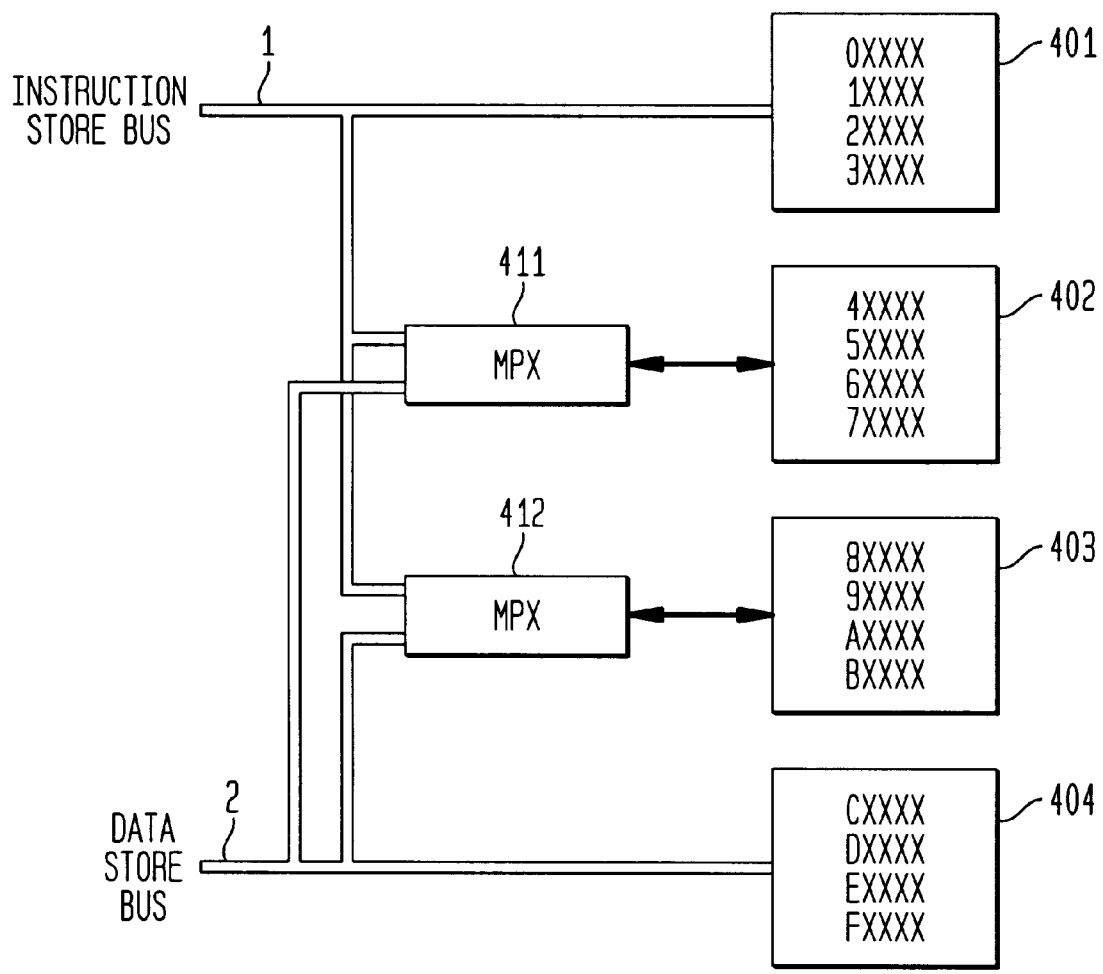
FIG. 4 is a diagram illustrating how the boundary between instructions and data can be shifted in accordance with Applicants' invention.

FIG. 4 illustrates an arrangement for allowing a variable border between the instruction range and the data range. In this preferred embodiment, Applicants' illustrate the use of a high speed store having a capacity of 1 mega-word for supplying data and instructions of the most frequently used portions of the control program. The one mega-word store is broken down into four blocks, (401), (402), (403), (404), each of which contains one-quarter of one mega-word of storage. In this preferred embodiment, memory block (401) is permanently tied to the instruction bus (1), and memory block (404) is permanently tied to data store bus (2). However, the two middle stores, stores (402) and (403), are connected via multiplexers (411) and (412) to both buses. Under the control of boundary divider control (309), in the alternate mode control register shown on FIG. 3, memory blocks (402) and (403) can be connected to either the instruction store bus or the data store bus. If both are connected to the data store bus, for example, then the instruction storage of the fast-store is limited to 0.25 mega-words, while the data storage has 0.75 mega-words; if memory block (402) is connected via multiplexer (411) to the instruction store bus (1) and memory block (403) is connected via multiplexer (412) to data store bus (2), then there is room in the fast-store for 0.5 mega-words of instructions and 0.5 mega-words of data; if the memory block (402) is connected via multiplexer (411) to instruction bus (1), and memory block (403) is connected via multiplexer (412) to instruction store bus (1), then the system has available 0.75 mega-words of fast instruction store and 0.25 mega-words of fast data store. The object is to provide facilities, where depending on the needs of a particular application program being executed, the optimum amount of fast instruction store and fast data store can be provided. When a second application program begins executing the amount of fast instruction store and fast data store can be readjusted to become optimum for this second application program.

If this facility for the fast store is used in conjunction with the arrangement shown in FIG. 2, then block (220) with range 0XXXXX is left out of FIG. 2 in order to provide the necessary address space for the 1 mega-word of storage provided by blocks (401), (402), (403), and (404). The address controllers (24) and (25), (FIG. 1), is modified to take into account this early section of memory and to accept inputs from the boundary divider control (309) of the alternate mode control register.

In this preferred embodiment, only the 1 mega-word of fast storage has the variable boundary between instruction and data stores. Clearly, the variable boundary can be extended to other stores provided that the other stores within the variable boundary have access through both the instruction and data buses, and that the address controllers are suitably modified to steer addresses and data, (in the case of the data bus), to the correct bus system.

Advantageously, with this arrangement, the border between instruction storage and the data storage can be moved. More broadly, if it is not necessary to have instruction storage in contiguous blocks, then each separately addressable block of memory can be defined as a data block or an instruction block.

The above description is of one preferred embodiment of Applicants' invention. Many other variations will be apparent to those of ordinary skill in the art without departing from the scope of the invention. The invention is limited only by the attached claims.

We claim:

1. In a data processing system, apparatus comprising:
   a processing unit; and
   two memory communities;
   said processing unit concurrently generating memory addresses for two separate purposes, each purpose for one of said memory communities;
   said processing unit having variable control means for controlling which ranges of memory addresses are to be associated with each of said two separate purposes;
   wherein said processing unit controls two bus systems, one for each of said purposes; and
   wherein addresses for each of said two purposes are transmitted over a bus system for said purpose.

2. The apparatus of claim 1, wherein said two purposes are instruction storage and data storage.

3. The apparatus of claim 2, wherein said two memory communities comprise high-speed storage, and wherein said system further comprises additional storage.

4. The apparatus of claim 1, wherein said system further comprises additional storage;
   wherein said additional storage comprises two additional communities of memory, and wherein said processing unit has two modes of operation for controlling said additional communities;
   in a first mode of operation, said processing unit treating said two communities of memory as having non-overlapping addresses, wherein contents of memory may be concurrently accessed from each of the additional communities with the two addresses being concurrently generated, refer to different communities;
   in a second mode, all addresses generated for said additional two communities for a first purpose being used for accessing a first of the two additional communities, and all addresses being generated for a second purpose, being used to access the second additional community.

5. The apparatus of claim 4, wherein the two purposes are data access and instruction access.

6. The apparatus of claim 5, further comprising segment control means for selecting a segment within one of said additional communities.

7. The apparatus of claim 5, further comprising means for changing modes in one cycle of said processing unit.

8. The apparatus of claim 5, wherein said second mode comprises three sub-modes:
   in a first of these sub-modes, only the first of the two additional communities can be addressed under segment control;
   in a second sub-mode, only the second of the two additional communities can be addressed under segment control; and
   in a third sub-mode, both of the additional communities can be addressed under segment control.

* * * * *